US 6,896,958 B1

United States Patent
Cayton et al.

(10) Patent No.: US 6,896,958 B1
(45) Date of Patent: May 24, 2005

(54) SUBSTANTIALLY TRANSPARENT, ABRASION-RESISTANT FILMS CONTAINING SURFACE-TREATED NANOCRYSTALLINE PARTICLES

(75) Inventors: Roger Cayton, Naperville, IL (US); Richard W. Brotzman, Jr., Naperville, IL (US); Marc Kullberg, Lisle, IL (US)

(73) Assignee: Nanophase Technologies Corporation, Romeoville, IL (US)

( * ) Notice: Subject to any disclaimer, the term of this patent is extended or adjusted under 35 U.S.C. 154(b) by 667 days.

(21) Appl. No.: 09/726,686

(22) Filed: Nov. 29, 2000

(51) Int. Cl.[7] .................................................. B32B 5/16
(52) U.S. Cl. ...................... 428/323; 428/328; 428/403; 428/405; 428/407; 252/15.2; 252/363.5; 427/213; 427/221; 427/219; 427/36; 528/12; 528/32; 528/40; 528/43
(58) Field of Search ................................. 428/403, 405, 428/407; 427/213.36, 221, 219; 528/12, 32, 40, 43; 252/15.2, 36.35, 363.5

(56) References Cited

U.S. PATENT DOCUMENTS

| | | | | |
|---|---|---|---|---|
| 4,289,991 A | | 9/1981 | Schreurs | |
| 4,482,656 A | * | 11/1984 | Nguyen | 428/407 |
| 4,624,971 A | * | 11/1986 | van Tao | 428/407 |
| 5,853,809 A | | 12/1998 | Campbell et al. | |
| 5,853,830 A | * | 12/1998 | McCaulley | 428/35.7 |
| 5,885,657 A | * | 3/1999 | Penth | 427/372.2 |
| 5,958,514 A | * | 9/1999 | Havey | 427/386 |
| 5,993,967 A | * | 11/1999 | Brotzman | 428/407 |
| 6,001,163 A | * | 12/1999 | Havey | 106/287.13 |
| 6,033,781 A | * | 3/2000 | Brotzman | 428/405 |
| 6,051,296 A | * | 4/2000 | McCaulley | 428/35.7 |
| 6,093,473 A | | 7/2000 | Min | |

* cited by examiner

*Primary Examiner*—Leszek B Kiliman
(74) *Attorney, Agent, or Firm*—Wildman, Harrold, Allen & Dixon LLP (57) ABSTRACT

A film-forming composition contains surface-treated nanocrystalline particles dispersed in a cross-linkable resin. A substantially transparent, abrasion-resistant film is formed from the film-forming composition. Processes for preparing the film-forming composition and for preparing a substantially transparent, abrasion-resistant film are also included. The surface-treated nanocrystalline particles may be obtained by treating nanocrystalline particles with one or more siloxane species, such as a siloxane star-graft polymer coating.

51 Claims, 2 Drawing Sheets

SUBSTANTIALLY TRANSPARENT, ABRASION-RESISTANT FILMS CONTAINING SURFACE-TREATED NANOCRYSTALLINE PARTICLES

FIELD OF THE INVENTION

This invention relates generally to substantially transparent, abrasion-resistant films containing nanocrystalline particles. More particularly, the present invention relates to nanocrystalline particles treated so as to render them more dispersible in polymer-based cross-linkable resins and to provide improved transparency and abrasion resistance, hardness, and/or scratch resistance to films prepared from such cross-linkable resins.

BACKGROUND OF THE INVENTION

Substantially transparent films are employed in numerous different industries to provide a protective and/or decorative coating to a surface, such as with floor and countertop coverings and automotive coatings. Such films can serve to protect the coated substrate from damage due to the environmental stress, radiation, temperature, scratching, and chipping. An example of an abrasion-resistant floor covering is sold by Perstop Flooring AB (Sweden) under the trademark PERGO.

Other attempts to improve the hardness of films prepared from cross-linkable resins, while maintaining optical transparency, have incorporated inorganic particles with diameters varying from the nanometer range to the micron range and with varying solid forms. However, the nanometer range particles used in previous attempts (for example, colloidal silica) typically have not been crystalline in nature and have not been in the form of nanocrystalline particles. As a result, such particles do not impart the same degree of improvement in the physical properties of the cross-linked resin film when employed at comparable concentrations as nanocrystalline particles. Further, micron range particles do not impart the same degree of clarity in the cross-linked resin film as nanocrystalline particles when employed at comparable concentrations, due to a greater extent of light reflection caused by the larger micron range particles.

The degree of dispersion of inorganic particles throughout a cross-linked resin film affects the maintenance of optical transparency. Inefficient particle dispersion results in agglomeration, leading to higher transmitted and reflected haze and lower transparency in films containing the particles. Higher dispersion can be achieved through treatment of the surface of the particles in order to provide compatibility between the particles and the environment or film matrix in which they are dispersed. Different surface treatments have been employed for use with dispersed inorganic particles, resulting in different film/particle compositions.

U.S. Pat. No. 5,853,809 discloses a clearcoat coating composition that includes reactive, colorless, inorganic microparticles dispersed in a coating composition. These inorganic microparticles may have an average diameter in the range of from about 1.0 to about 1000 nanometers, preferably from about 2 to about 200 nanometers, and most preferably from about 4 to about 50 nanometers. The coating composition includes a binder system having a cross-linkable resin for forming a transparent film, and a polyvalent linking agent, such as a silane coupling agent, intended to bind the inorganic microparticles to the resin. Colloidal silicas are preferred as the microparticles, and such silicas may be in colloidal, fumed, or amorphous form. The patent does not disclose the use of nanocrystalline particles, or any particles comprising alumina, titania, ceria or zinc oxide, which differ substantially from silica. The patent does not disclose that nanocrystalline particles may be surface treated before being included in a cross-linkable resin or that such treated nanocrystalline particles have advantages in clearcoat coating compositions.

U.S. Pat. No. 5,993,967 describes a coated ceramic powder comprising ceramic particles and a siloxane star-graft polymer coating and a method for preparing same. U.S. Pat. No. 6,033,781 describes the use of a coating composition and preparation method disclosed in U.S. Pat. No. 5,993,967 for application to a plurality of ceramic particles. U.S. Pat. No. 5,993,967 and U.S. Pat. No. 6,033,781 are each incorporated herein by reference.

U.S. Pat. No. 6,001,163 describes transparent coatings from aqueous-organic solvent mixtures containing an epoxy functional silane, a tetra-functional silane, and a multifunctional compound from the group of carboxylic acids and anhydrides. Although the patent describes a siloxane composition that can be applied to substrates to form a transparent coating, the siloxanes are disclosed as film-forming compositions rather than particle coatings or modifiers. The patent does not describe the use of nanocrystalline particles or the surface-treatment of such particles.

Inorganic and organic particles can be modified by absorption, ion exchange, and covalent bonding. Surface modification by absorption and ion exchange require the particle surface to have appropriate chemical characteristics. Reactions that enable covalent bonding to inorganic particles generally involve reactions on hydroxylic surfaces.

Inorganic particles may be coated by graft polymerization and encapsulation. Inorganic powders may be coated by the precipitation of powders in the presence of suspended powders or by spray drying of polymer solutions containing the powder. However, these conventional methods yield uneven coatings and the formation of coated agglomerates.

Transparent films that exhibit an improved hardness, scratch resistance, abrasion resistance, and optical transparency are desired.

SUMMARY OF THE INVENTION

Improved films are formed from cross-linkable resins having surface-treated nanocrystalline particles, disposed therein. Such films exhibit improved hardness, scratch resistance, and abrasion resistance, compared to films from cross-linkable resins that do not contain such treated nanocrystalline particles. Such films also exhibit improved optical transparency compared to films from cross-linkable resins that contain inorganic particles having larger average particle size or lower crystallinity than nanocrystalline particles.

A process is provided for making a film-forming composition containing surface-treated nanocrystalline particles dispersed in a cross-linkable resin. The process comprises adding nanocrystalline particles to a medium, the nanocrystalline particles being selected from the group consisting of ceramics and metals. Then the nanocrystalline particles and medium are mixed to form a dispersion. A surface treatment solution is added to the nanocrystalline particle dispersion. This surface treatment solution comprises one or more siloxane species, and the nanocrystalline particle dispersion is mixed with the surface treatment solution such that one or more siloxane species are disposed at the surface of at least some of the plurality of particles. As a result, surface-treated nanocrystalline particles are obtained. Next, the said surface-treated nanocrystalline particles are added to a cross-linkable resin to form a film-forming composition, whereby a cross-linkable film-forming composition is formed.

As another aspect, a film-forming composition is provided. The film-forming comprises a cross-linkable resin and a plurality of surface-treated nanocrystalline particles dispersed in the cross-linkable resin. The surface-treated nanocrystalline particles comprises nanocrystalline particles and at least one siloxane species disposed at the surface of at least some of the plurality of particles. The nanocrystalline particles are selected from the group consisting of ceramics and metals. Alternatively, a film-forming composition is made by any of the present methods.

As yet another aspect, a process is provided for forming a transparent, abrasion-resistant film from a film-forming composition. Such a film is made by applying a film-forming composition to a substrate, and forming a substantially transparent, abrasion-resistant film on the substrate from the film-forming composition. Any suitable means may be used to form the film from the composition and resin. The film-forming composition may be applied to the substrate at a thickness of less than about 2 mils, preferably at a thickness of about 1 mil.

As another aspect, a substantially transparent, abrasion-resistant film is provided. The film comprises a cross-linked resin and a plurality of surface-treated nanocrystalline particles dispersed in the cross-linked resin.

In the present processes and compositions, the siloxane species preferably comprises one or more siloxane-based polymers and more preferably comprises one or more siloxane star-graft coating polymers.

DETAILED DESCRIPTION OF THE PREFERRED EMBODIMENTS

Figure 1:
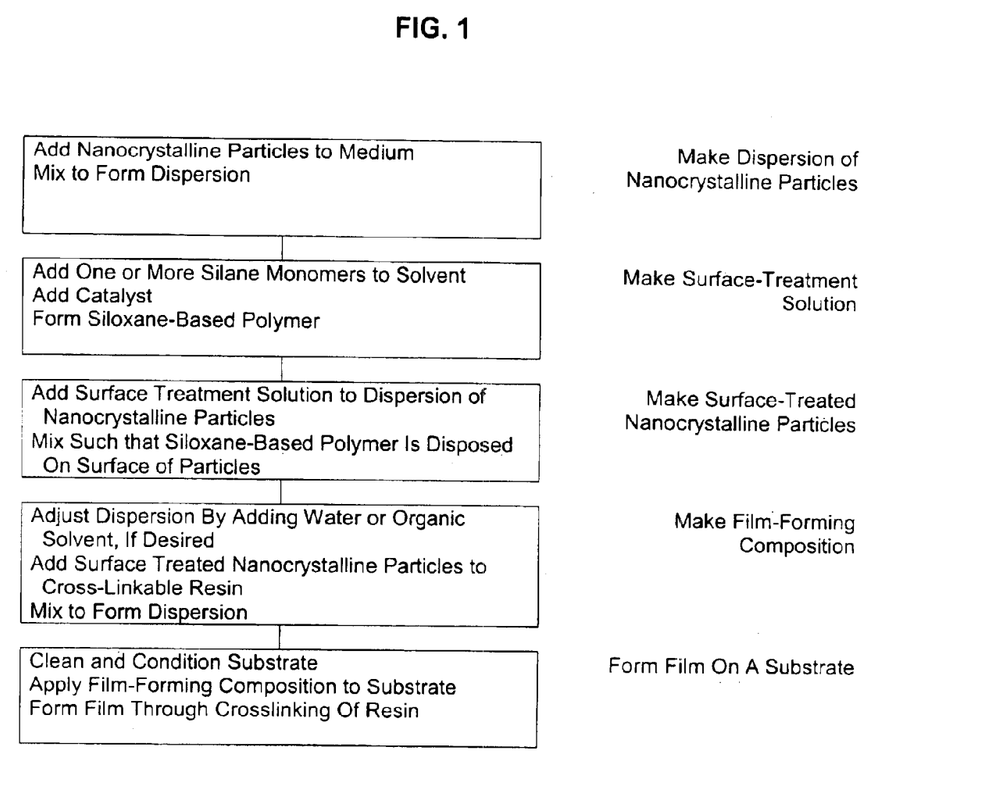
FIG. 1 is a flow diagram for embodiments of processes for making film-forming compositions and transparent, abrasion-resistant films.

Turning first to FIG. 1, there is shown a flow diagram for embodiments of the present processes, for making substantially transparent, abrasion-resistant films and for making film-forming compositions suitable for forming such films.

As a first step, nanocrystalline particles are mixed with an appropriate medium by any suitable method to produce a dispersion of nanocrystalline particles. The nanocrystalline particles should be free from agglomeration. Suitable mixing techniques to prepare the dispersions include, but are not limited to, stirring, high-shear mixing, ultrasonic vibration, and blending in a media mill.

"Nanocrystalline particles" are those materials having a mean particle diameter less than about 100 nanometers, and a bulk phase characterized as being comprised of a nonporous crystalline lattice. The nanocrystalline particles may comprise materials including, but not limited to, ceramics (such as metal oxides, mixed metal oxides, and nonmetal oxides) and metals. Preferably, the nanocrystalline particles comprise materials selected from the group consisting of the oxides of aluminum, titanium, zinc, cerium, tin, antimony, indium, iron, strontium, barium, and yttrium, including mixed oxides, and combinations or mixtures of any of the foregoing oxides. "Mixed oxides" are oxide compounds having more than one other element in addition to oxygen. More preferably, the nanocrystalline particles comprise materials selected from the group consisting of oxides of aluminum, titanium, zinc, and cerium, mixed oxides thereof, and combinations or mixtures of any of the foregoing. As used herein, the term "ceramic" refers to metal oxides, including but not limited to titanium dioxide ($TiO_2$; sometimes referred to as "titania"), alumina ($Al_2O_3$), zinc oxide (ZnO), and iron oxides including $\gamma$-$Fe_2O_3$ (brown in color), $\alpha$-$Fe_2O_3$ (red in color) and ferrous oxide ($Fe_3O_4$; black in color; sometimes referred to as "magnetite"), mixed metal oxides, and less preferably, nonmetal oxides, including but not limited to silicon dioxide ($SiO_2$; sometimes referred to as "silica"). Ceramics differ from colloidal silicas in the present context in that ceramics are crystalline.

In the preferred method, the nanocrystalline particle is $TiO_2$, $Al_2O_3$, ZnO, $Fe_2O_3$ or $SiO_2$. Where the nanocrystalline particle is $TiO_2$, the nanocrystalline particles preferably further comprise $Al^{+3}$ centers to introduce surface defects into the $TiO_2$ powder, thereby rendering the treated $TiO_2$ powder non-photoactive.

Alternatively, a further quantity of aluminum tri-sec-butoxide is optionally added to a reaction vessel comprising the $TiO_2$ powder when the dispersion is formed, to introduce surface defects into the $TiO_2$ powder, thereby rendering the coated $TiO_2$ powder non-photoactive.

A dispersion should be prepared comprising 100%, alternatively 90%, nanocrystalline particles having a mean particle diameter of less than 100 nm. For present purposes, it is acceptable to consider the mean particle diameter as the mean equivalent spherical diameter reported by a particle size analyzer employing light diffraction, gas adsorption, or other suitable technique, even where the particles themselves may not be totally spherical in shape. In fact, such particle size analyzers are suitable for determining the mean particle diameter, for present purposes, of materials having a relatively large aspect ratio.

The medium in which the nanocrystalline particle dispersion is prepared can be any medium in which the nanocrystalline particles will remain suspended. Such mediums are known to those skilled in the art. The medium should form a homogeneous phase with the solvent of the surface treatment solution. Suitable mediums for the nanocrystalline particle dispersion include, but are not limited to, water, hydrocarbons, hydrocarbons containing at least one oxygen atom such as alcohols, ethers, ketones, aldehydes, esters, epoxides, and combinations thereof, hydrocarbons containing at least one nitrogen atom, and hydrocarbons containing at least one oxygen atom and at least one nitrogen atom. Preferably the medium will be a polar liquid and most preferably will be water.

The concentration of the nanocrystalline particles in the dispersion can range between about 0.1 and about 75 weight percent, preferably between about 1 and about 50 weight percent, and more preferably between about 5 and about 40 weight percent weight.

A concentrated dispersion of the nanocrystalline particles is obtained and is substantially stable. By substantially stable, it is meant that the particles do not readily agglomerate, aggregate, or undergo further substantial chemical activity. In other words, there is substantially no latent chemical activity between the nanocrystalline particles in the dispersion.

Figure 2:
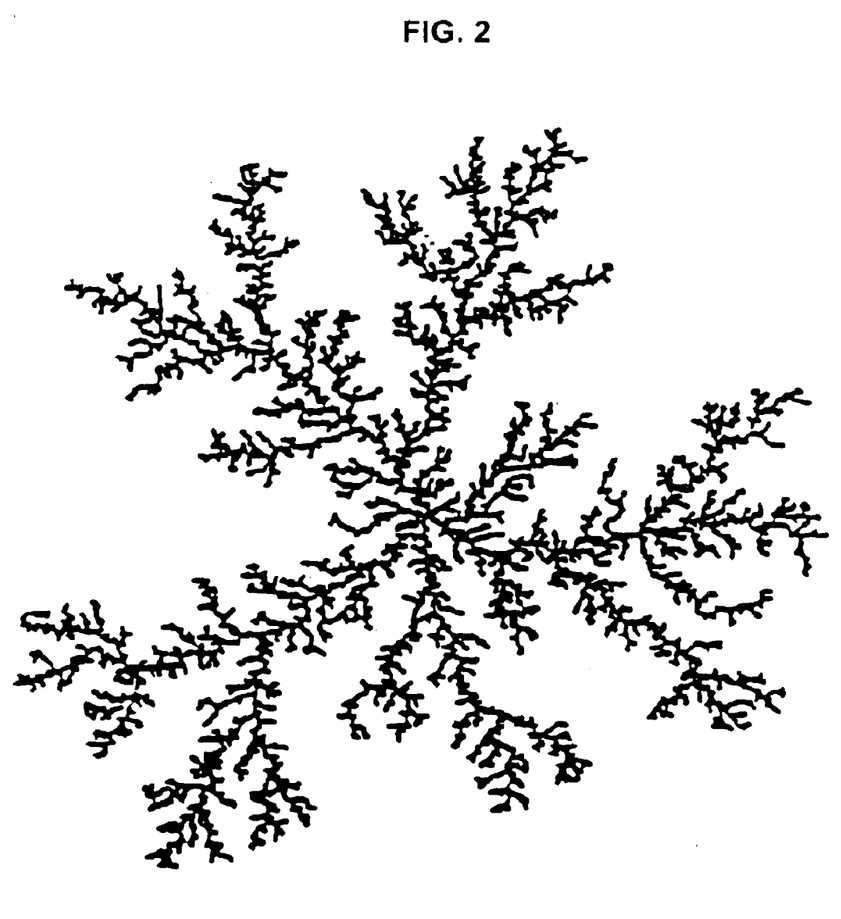
FIG. 2 is a schematic diagram of a fractal, siloxane star-grafted polymer.

A surface treatment solution is prepared for the purpose of treating the surface of the nanocrystalline particles. The surface treatment solution and application improves compatibility between the nanocrystalline particles and the cross-linked resin. The surface treatment solution comprises one or more siloxane species that will adhere to the surface of the nanocrystalline particle. Preferably, the siloxane species is a siloxane-based polymer, more preferably, a siloxane star-graft polymer. A schematic diagram of a fractal, siloxane star-graft coating polymer is shown in FIG. 2. The structure is shown in two dimensions but is actually a three dimensional structure.

The surface treatment solution is prepared by the mixing of one or more silanes containing functional groups with water, a suitable catalyst, and a suitable solvent. The functional groups on the silanes may contain one or more hydroxyl or alkoxy substituents or other group that is functional for polymerization. Silanes that have been found to be useful for the surface treatment are of the type, $R_n Si(OR')_{4-n}$, where R and R' are hydrocarbyl entities, optionally containing one or more substituent groups represented by, but not limited to, alkyl, unsaturated alkyl, aromatic, alcohol, aldehyde, ester, epoxide, carboxylic acid, ether, ketone, amine, sulfonate, thiol, phosphine, phosphate, cyanate, isocyanate, fluoro, chloro, bromo, and pyridine, and n is 0, 1, 2, or 3. R' is preferably an alkyl group. Preferably, the surface treatment solution will be prepared from a combination of at least four silanes, with at least one silane selected from the group defined when n is 0, at least one silane selected from the group defined when n is 1, at least one silane selected from the group defined when n is 2, and at least one silane selected from the group defined when n is 3. More preferably, the surface treatment composition and process described in U.S. Pat. No. 5,993,967 and U.S. Pat. No. 6,033,781 may be used.

Preferably, the surface treatment solution comprises a siloxane-based polymer formed by reacting silane monomers in solution to form a siloxane-based polymer. The siloxane-based polymer is disposed on the surface of, and preferably encapsulates, the nanocrystalline particles. In such case, the treated nanocrystalline particles comprise a plurality of nanocrystalline particles and a coating, preferably a siloxane star-graft polymer coating, encapsulating at least some of the particles. The siloxane star-graft polymer coating preferably comprises the reaction product of tetrafunctional, trifunctional, difunctional, and monofunctional silane monomers. As used herein, the letters w, x, y and z represent the mole percent of the tetrafunctional, trifunctional, difunctional and monofunctional monomeric units. Preferably, w is about 20–100, x is from 0 to about 30, y is from 0 to about 50, and z is from 0 to about 10, and at least one of x, y and z is greater than zero. The term "functional", when used to describe the silane monomers used in the present methods and compositions, means a group capable of polymerization, including without limitation, alkoxy, halide, cyano, and amide substituents and others. Generally, where R is an alkyl substituent, it is not considered a "functional" group, in that it generally has little or no susceptibility to polymerization.

A preferred surface treatment solution comprises a siloxane-based polymer that is a reaction product of: the tetrafunctional silane tetraethylorthosilicate; at least one trifunctional silane selected from the group consisting of γ-glycidoxypropyltrimethoxysilane, n-hexyltrimethoxysilane, isobutyltrimethoxy-silane, γ-methacryloxypropyltrimethoxysilane, n-octadecyltrimethoxysilane, and n-propyltrimethoxysilane; at least one difunctional silane selected from the group consisting of dicyclohexyldimethoxysilane, diethyldiethoxysilane, dimethyldichlorosilane, dimethyldiethoxysilane, dimethyldimethoxysilane, diphenyldiethoxysilane, diphenyldimethoxysilane, di-n-hexyldichlorosilane, n-hexylmethyldichlorosilane, methyldodecyldiethoxysilane, neophylmethyldimethoxysilane, and n-octylmethyldi-methoxysilane; and at least one monofunctional silane selected from the group consisting of n-octadecyldimethylmethoxysilane, triethylsilanol, trimethylethoxysilane, and trimethylmethoxysilane.

The surface treatment solution may optionally include a catalyst. Alternatively, the catalyst may be added to a mixture of the surface treatment solution and the nanocrystalline particle dispersion. Suitable catalysts include mineral and organic acids, preferably mineral acids, and most preferably hydrochloric acid.

The solvent used in the surface treatment solution should contain an alcohol functional group and form a compatible mixture with the medium used in dispersing the nanocrystalline particles. Preferably the solvent will be methanol, ethanol, or mixtures thereof.

The dispersion of nanocrystalline particles is mixed with the surface treatment solution to form surface-treated nanocrystalline particles. Ideally, the particles are partially or wholly coated with siloxane. The ratio of surface treatment solution to nanocrystalline particle dispersion should be such that the silane or siloxane weight percentage with respect to total particle weight is in the range of about 0.1 to about 50 weight percent, preferably between about 0.5 and about 30 weight percent, and most preferably between about 2 and about 20 weight percent.

In addition, the surface treatment process may optionally include the addition of ionic charge. The types of ionic charge to be used include, but are not limited to, solutions of organic and inorganic acids, bases, and salts, as well as suspensions of charged particles. Preferably the ionic charge is applied as an aqueous solution of sodium bisulfite (or sodium metabisulfite) or as an alcoholic solution of charged silica particles. The amount of ionic charge to be added should be in the range of 0 to 10 mole ratio to total silane, preferably in the range of 0 to 2 mole ratio.

The surface-treated nanocrystalline particles may then be mixed with a cross-linkable resin. The term "cross-linkable resin" refers to any cross-linkable resin suitable for use in an aqueous or organic-solvent based composition, and is meant to include resins capable of being cross-linked. Examples of such cross-linkable resins include acrylics, aminoplasts, urethanes, carbamates, carbonates, polyesters, epoxies, silicones, and polyamides. For the present methods and compositions, preferred resins include aminoplasts such as melamine formaldehydes, urethanes, carbamates, carbonates, polyesters, silicones, and polyamides, with aminoplasts being particularly preferred. These resins may also contain functional groups characteristic of more than one class, as for example, polyester amides, urethane acrylates, carbamate acrylates, and others. The combination of the cross-linkable resin and the treated nanocrystalline particles forms a film-forming composition that can be used to make substantially transparent, abrasion-resistant films.

The film-forming composition may be a single continuous phase or may include a discontinuous phase. For example, the film-forming composition may be an emulsion. Similarly, the cross-linkable resin may be a continuous phase or be present in a discontinuous phase. Typically, the treated nanocrystalline particles will be dispersed in cross-linkable resin before an emulsion of that resin is prepared.

When desired, generally known cross-linking agents can be included. The choice of cross-linking agent depends on factors such as compatibility with the cross-linkable resin. The cross-linking agent is used to cross-link the resin by either condensation reactions or non-free radical addition reactions or a combination of both. Examples of cross-linking agents include blocked and/or unblocked diisocyanates, diepoxides, aminoplasts, phenol/formaldehyde adducts, carbamates, siloxane groups, cyclic carbonate groups, and anhydride groups.

After the cross-linkable resin is prepared such that it contains treated nanocrystalline particles, a film can be prepared from the cross-linkable resin.

The concentration of treated nanocrystalline particles to be mixed with the resin should be in the range of about 0.1 to about 50 weight percent, preferably about 1 to about 40 weight percent, and more preferably about 5 to about 25 weight percent. These weights are determined with respect to the weight of the treated nanocrystalline particles themselves, not based upon the weight of the treated nanocrystalline particle dispersion. When the treated nanocrystalline particles are added while in a dispersion, the weight percentage should be determined based on the particles.

In preparing a siloxane-based polymer for surface treatment, the letters w, x, y and z represent the mole percent of the tetrafunctional, trifunctional, difunctional, and monofunctional silane monomers used to prepare the siloxane-based polymer. The values of w, x, y and z in the preparation of the silicon-based polymers may range from about 20 to about 100, 0–30, 0–50 and 0–10, respectively or alternatively, from about 45 to about 75, from about 5 to about 25, from about 5 to about 45, and from about 5 to about 10, respectively. These mole percentages are approximate and may vary without departing from the present methods. Various combinations are employed to control the fractal nature of the siloxane backbone and its chemical nature, that is, the degree of thermodynamic compatibility with a specific diluent of the coating molecule. The chemical identity of the groups may also be varied extensively. Similarly, the ratio of total moles of water to the total moles silicon may be varied from 1 to 6, and the acid character of the polymerization medium may be varied widely. Examples of monomers that may be used to form the surface treatment solution are included, but not limited to, those set forth in Table 1:

TABLE 1

| Monomer | Functionality | Boiling Point |
| --- | --- | --- |
| Dicyclohexyldimethyoxysilane | 2 | 104° C./0.7 mm |
| Diethyldiethoxysilane | 2 | 157° C. |
| Dimethyldichlorosilane | 2 | 70° C. |
| Dimethyldiethoxysilane | 2 | 114° C. |
| Dimethyldimethoxysilane | 2 | 82° C. |
| Diphenyldiethoxysilane | 2 | 167°/15 mm |
| Diphenyldimethoxysilane | 2 | 161.15° C. |
| Di-n-hexyldichlorosilane | 2 | 111° C. |
| γ-Glycidoxypropyltrimethoxysilane | 3 | |
| n-Hexylmethyldichlorosilane | 2 | 204° C. |
| n-Hexyltrimethoxysilane | 3 | 202° C. |
| Isobutyltrimethoxysilane | 3 | 154° C. |
| γ-Methacryloxypropyltrimethoxysilane | 3 | |
| Methyldodecyldiethoxysilane | 2 | 140° C. |
| Neophylmethyldimethoxysilane | 2 | 68° C. |
| n-Octadecyltrimethoxysilane | 3 | 150° C. |
| n-Octadecyldimethylmethoxysilane | 1 | 184° C. |
| n-Octylmethyldimethoxysilane | 2 | 107° C. |
| n-Propyltrimethoxysilane | 3 | 142° C. |
| Tetraethylorthosilicate | 4 | 169° C. |

TABLE 1-continued

| Monomer | Functionality | Boiling Point |
| --- | --- | --- |
| Triethylsilanol | 1 | 75° C./24 mm |
| Trimethylethoxysilane | 1 | 75° C. |
| Trimethylmethoxysilane | 1 | 57° C. |

A. General Procedure For Preparing Siloxane-Based Polymer For The Surface Treatment Solution The following is a general procedure for preparing a siloxane-based polymer for a surface treatment solution.
(1) Add the following chemicals to a reaction vessel that has been purged with dry nitrogen and stir:
  (a) 61 ml of anhydrous ethanol (Aldrich # 27764.9 or equivalent);
  (b) 43.04 ml of tetraethylorthosilicate (TEOS FW 208.33, Aldrich # 33385-9 or equivalent);
  (c) 15.45 ml of n-octyldecyl-trimethyloxysilane (n-ODTMS FW 374.68, Petrach # 09780 or equivalent);
  (d) 3.84 ml of diphenyldimethoxysilane (DPDMS FW 244.36, Petrach # D6010 or equivalent);
  (e) 2.15 ml of trimethylethoxysilane (TMES FW 118.25, Petrach # T2970 or equivalent);
  (f) 3.67 ml of deionized water;
  (g) 2.0 ml of 0.1 N hydrochloric acid (VWR Catalog No. VW3200-1 or equivalent).
(2) Heat the mixture at 60° C. for 1.5 hours.
(3) Store the prepared sol at 5° C.
(4) When ready for use, add water or organic solvent as desired. For example, it may be desirable to add water or organic solvent sufficient to reduce viscosity or to adjust coverage of the particle by the polymer. By lowering the concentration of siloxane-based polymer in the surface treatment solution, there is less polymer per unit volume of solution to treat the surface of the particles. A lower concentration may be desired when it is not desired to coat the entire particle.

B. Batch Process For Treated Nanocrystalline Particles

The following is a process description for preparing surface treated nanocrystalline particles in 10 gallon batches, optimized with high shear mixing:
(1) Preparation of the surface treatment solution:
  (a) Purge a 10 liter reaction vessel with dry nitrogen and stir.
  (b) Add:
    1527 ml of anhydrous ethanol;
    1039 ml of tetraethylorthosilicate;
    387 ml of n-octyldecyltrimethoxy silane;
    156 ml of diphenyldimethoxy-silane;
    81 ml of trimethylethoxysilane
    93 ml of deionized water;
    50 ml of 0.1 N hydrochloric acid.
  (c) Heat at 60° C. for 1.5 hours.
  (d) Store at 5° C.
  (e) When ready for use, add water or organic solvent as desired.

The product prepared by the above batch process contains approximately 15-weight percent (wt %) siloxane-based polymer.
(2) Preparation of a treated $TiO_2$ polymer:
  (a) Wet powder; add Al-undercoat:
    Purge a 50 liter passivated vessel with argon and stir. Add 20 liters of suitable reaction solvent (such as, for example, anhydrous ethanol, ethanol and/or isopropanol) and 5 kg $TiO_2$ powder. Mix 555 ml of suitable reaction solvent (such as, for example, anhydrous ethanol, ethanol and/or isopropanol), aluminum tri-sec-butoxide ("ASTB") and approximately 500 ml isopropanol.

Add ASTB solution in a small stream via cannula by argon pressure displacement. The addition of ASTB introduces $Al^{+3}$ centered surface defects into the $TiO_2$ powder, thereby rendering the powder non-photoactive.

(b) Dilute; coat powder:
Add 4 liters of reaction solvent.
High-shear mix at 7000 rpm for 30 minutes. Temperature increases as the coating reaction proceeds;
large-scale reactions may need to be cooled if the temperature increase exceeds 50° C.
Add 3333 ml of the 15 wt % coating polymer.
High-shear mix at 7000 rpm for 30 minutes.

(c) Separate and purify:
Add 6 liter of deionized water.
High-shear mix at 7000 rpm for 20 minutes.
Collect by centrifugation.

(d) Optionally, wash by repeating procedure (c).
(e) Optionally, dry the wet cake.

(3) Preparation of a dispersion of treated nanocrystalline particles:
Add dry powder or wet cake to an organic carrier fluid such as, for example, 1-methoxy-2-propanol acetate.
Remove reaction solvents if necessary.
Mix thoroughly.

C. Specific Examples

The following examples describe specific embodiments of the present techniques and their operation. These specific examples are not intended to limit the scope of the invention, as defined by the claims set forth herein, and equivalents thereof.

EXAMPLE 1

In this example, the surface-treated nanocrystalline alumina particles were prepared according to the present method in the following manner. A 250 g charge of nanocrystalline alumina particles (surface area as measured by BET=35 $m^2/g$) was mixed with sufficient deionized water to yield a 35 wt % slurry, which was then high-shear mixed using a rotor/stator mixer for 30 minutes at 4500 RPM, followed by 30 minutes of sonication. The slurry was allowed to settle for 30 minutes, after which time it was decanted and the resulting supernatant was centrifuged for 20 minutes at 2500 RPM. The supernatant recovered from the centrifuge step comprised an aqueous dispersion of nanocrystalline alumina particles, wherein at least 90% of the particles had a mean diameter of less than 100 nanometers. This dispersion of nanocrystalline particles will be referred to herein as Dispersion A1.

A surface-treatment solution was prepared by combining 8.305 g of tetraethylorthosilicate, 11.782 g of 3-(glycidoxypropyl)trimethoxysilane, 1.218 g diphenyldimethoxysilane, 0.589 g trimethylethoxysilane, 15.905 g anhydrous ethanol, 0.661 g 0.1N hydrochloric acid, and 1.458 g deionized water in a flask and heating at 60° C. for 1.5 hr under an argon atmosphere. The solution was cooled to room temperature, and designated as Solution B.

Solution B was added to Dispersion A1 and the resultant mixture blended in a high-shear mixer at 3500 RPM for 45 minutes to yield Dispersion C1. Following high-shear mixing, Dispersion C1 was stirred rapidly with a mechanical paddle-blade mixer during which time a solution containing 4.737 g of sodium metabisulfite dissolved in 6.000 g of deionized-water was added. The resulting product was designated as Dispersion D1.

To a 62.5 g charge of an aqueous solution of melamine-formaldehyde resin (50 wt % polymer) was added 19.841 g of Dispersion D1 and the mixture was blended in a media mill for 5 minutes to yield Blend 1. The alumina content of the nonvolatile fraction of Blend 1 was 20 wt %.

A 1 mil film of Blend 1 was applied to a glass slide and cured at 165° C. for 10 minutes. A substantially transparent, abrasion-resistant film was formed. The transparency and hardness of the film are described in Tables 2 and 3. The percent haze was measured at 0.65%, and the pencil hardness was B (50 g) and 2B (100 g).

EXAMPLE 2 (COMPARATIVE)

A 1 mil film of melamine-formaldehyde resin (50 wt % polymer), not containing alumina particles, was applied to a glass slide and cured at 165° C. for 10 minutes. The transparency and hardness of the resulting film are listed in Tables 2 and 3. The percent haze was measured at 0.45% and the pencil hardness was 6B (50 g) and <6B (100 g), indicating that compared to the film prepared in Example 1, the film prepared from resin without nanocrystalline alumina particles has a similar haze value but was substantially softer as measured by the pencil hardness test.

EXAMPLE 3 (COMPARATIVE)

A 250 g charge of fused alumina particles (mean diameter=25 $\mu$m) was mixed with sufficient deionized water to yield a 35 wt % slurry referred to as Dispersion 3A. These alumina particles differ from those employed in Example 1 in that they are not nanocrystalline particles due to their larger particle size.

A solution was prepared by combining 8.305 g of tetraethylorthosilicate, 11.782 g of 3-(glycidoxypropyl) trimethoxysilane, 1.218 g diphenyldimethoxysilane, 0.589 g trimethylethoxysilane, 15.905 g anhydrous ethanol, 0.661 g 0.1N hydrochloric acid, and 1.458 g di-water in a flask and heating at 60° C. for 1.5 hr under an argon atmosphere. The solution was cooled to room temperature, and designated as Solution B.

5.07 g of Solution B was added to Dispersion A3 and blended in a high-shear mixer at 3500 RPM for 45 minutes to yield Dispersion C3.

To a 125 g charge of an aqueous solution of melamin-formaldehyde resin (50 wt % polymer) was added 44.643 g of Dispersion C3 and the mixture was blended in a media mill for 5 minutes to yield Blend 3. The alumina content of the nonvolatile fraction of Blend 3 was 10 wt %.

A 1-mil film of Blend 3 was applied to a glass slide and cured at 165° C. for 10 minutes. The % haze of the resulting film was measured to be 14.6%, which is substantially higher than that of Example 1 even though the film in Example 3 contains one half the amount of alumina as the film in Example 1.

EXAMPLE 4 (COMPARATIVE)

The procedure detailed in Example 3 was repeated with the exception that fused alumina with a mean particle diameter of 60 $\mu$m was used in place of the 25 $\mu$m diameter alumina particles to yield Blend 4 and 2.247 g of Solution B was added to Dispersion A4. These alumina particles also were not nanocrystalline particles due to their larger particle size. The alumina content of the nonvolatile fraction of Blend 4 was 10 wt %. A 1 mil film of Blend 4 was applied to a glass slide and cured at 165° C. for 10 minutes. The % haze of the resulting film was measured to be 14.4%, which is substantially higher than that of Example 1 even though the film in Example 4 contains one half the amount of alumina as the film in Example 1.

The transparency of films prepared from film-forming compositions comprising surface-treated nanocrystalline alumina particles blended into a formaldehyde-melamine cross-linkable resin was evaluated by measuring the percent haze of the films cured on glass slides and compared to the percent haze measured for films prepared from neat formaldehyde-melamine resin.

The hardness of films prepared from film-forming compositions comprising surface-treated nanocrystalline alumina particles blended into a formaldehyde-melamine resin was evaluated by the Pencil Test (ASTM D3363), and compared to films made from neat melamine-formaldehyde resin. In the Pencil Text, hardness is determined by the onset of a scratch for a given test weight. The scale for the Pencil Test in terms of calibrated lead hardness shown below. The difference between two adjacent leads is defined as one unit of hardness. The results of this test indicated that films containing 20 wt % coated and charged nanocrystalline alumina particles were at least 5 units harder than films not containing such particles. The hardness scale comprises the following values, ranging from softest to hardest: 6B, 5B, 4B, 3B, 2B, B, HB, F, H, 2H, 3H, 4H, 5H, 6H.

The resin was applied to the glass slides at 1.0 mil thickness, and the thickness of the cured film was 9.6 $\mu$m.

Table 2 reports the percent haze observed for all four examples. The first column in Table 2 describes the material used to form the film. The second column is the coated/charged alumina, expressed as percent by weight. The third column is the test weight in grams of the added particles. The fourth column is the percent haze. As shown in Table 2, the film forming with a composition comprising the present surface-treated nanocrystalline particles was the only film having particles added (in other words, the only film other than the film from neat resin) having a percent haze below 14%. Indeed, Example 1 had a percent haze of less than 1%, which constitutes a substantial improvement.

TABLE 2

| Material | Coated/Charged Alumina, wt % | Particle Size, $\mu$m | Haze |
|---|---|---|---|
| Neat Resin (Ex. 2) | 0 | none | 0.45% |
| Example 1 | 20 | 0.05 | 0.65% |
| Example 3 | 10 | 25 | 14.6% |
| Example 4 | 10 | 60 | 14.4% |

Column 1 in Table 3 is the cross-linkable material used to form the film. Column 2 is the coated/charged alumina, expressed as percent by weight. Column 3 is the test weight in grams. Column 4 is the hardness, measured by ASTM D3363 expressed as the lead number. Column 5 is the observed result.

TABLE 3

| 1 | 2 | 3 | 4 | 5 |
|---|---|---|---|---|
| Neat Resin (Ex. 2) | 0 | 100 | <6B | Visible scratch with 6B lead |

TABLE 3-continued

| 1 | 2 | 3 | 4 | 5 |
|---|---|---|---|---|
| Example 1 | 20 | 100 | 2B | No scratch visible with 2B lead |
| Neat Resin (Ex. 2) | 0 | 50 | 6B | Scratch barely visible with 6B lead |
| Example 1 | 20 | 50 | B | No scratch visible with B lead |

Accordingly, the examples demonstrate that that the surface-treated nanocrystalline particles improve the abrasion resistance and hardness of films formed from cross-linkable resins containing such particles and improve the clarity and optical properties of films, especially when compared to cross-linkable resins comprising micron range particles employed at comparable or greater concentrations.

What is claimed is:

1. A process for forming a substantially transparent, abrasion-resistant film from a film-forming composition containing surface-treated nanocrystalline particles dispersed in a cross-linkable resin, the process comprising the steps of:

(a) adding nanocrystalline particles to a medium, said nanocrystalline particles being selected from the group consisting of ceramics and metals;

(b) mixing the nanocrystalline particles and medium to form a dispersion;

(c) adding a surface treatment solution to the nanocrystalline particle dispersion, said surface treatment solution comprising one or more siloxane species;

(d) mixing the nanocrystalline particle dispersion with the surface treatment solution such that said one or more siloxane species are disposed at the surface of at least some of said particles, whereby at least some surface-treated nanocrystalline particles are obtained;

(e) adding said surface-treated nanocrystalline particles to a cross-linkable resin to from a film forming composition, wherein the surface treated nanocrystalline particles are non-aggregating;

(f) applying said film-forming composition to a substrate;

(g) forming a substantially transparent abrasion-resistant film on said substrate from said film-forming composition.

2. The process of claim 1 wherein the nanocrystalline particles comprise materials selected from the group consisting of the oxides of aluminum, titanium, zinc, cerium, tin, antimony, indium, iron, strontium, barium, and yttrium, mixed oxides comprising any of the foregoing elements, and combinations and mixtures of any of the foregoing oxides.

3. The process of claim 1 wherein the nanocrystalline particles comprise materials selected from the group consisting of oxides of aluminum, titanium, zinc, and cerium, mixed oxides comprising any of the foregoing elements, and combinations and mixtures of any of the foregoing oxides.

4. The process of claim 1, wherein the nanocrystalline particle dispersion has a concentration of the nanocrystalline particles in the range of from about 0.1 percent by weight to about 75 percent by weight.

5. The process of claim 4, wherein the nanocrystalline particle dispersion has a concentration of the nanocrystalline particles in the range of from about 1 percent by weight to about 50 percent by weight.

6. The process of claim 5, wherein the nanocrystalline particle dispersion has a concentration of the nanocrystalline particles in the range of from about 5 percent by weight to about 40 percent by weight.

7. The process of claim 1 wherein the film-forming composition is applied to the substrate at a thickness of less than about 2 mils.

8. The process of claim 1 wherein the film-forming composition is applied to the substrate at a thickness of about 1 mil.

9. The process of claim 1 wherein said surface treatment solution is prepared from one or more silane monomers defined by Formula I, wherein Formula I is $R_nSi(OR')_{4-n}$, wherein R is a hydrocarbyl entity, optionally containing one or more functional groups, R' is a hydrocarbyl entity, optionally containing one or more functional groups, and n is 0, 1, 2, or 3.

10. The process of claim 9 wherein R further comprises one or more functional groups selected from the group consisting of saturated or unsaturated alkyl, aromatic, alcohol, aldehyde, ester, epoxide, carboxylic acid, ether, ketone, amine, sulfonate, thiol, phosphine, phosphate, cyanate, isocyanate, fluoro, and pyridine.

11. The process of claim 9 wherein the surface treatment solution is prepared from at least four silanes, with at least one silane selected from the group defined by Formula I when n is 0, at least one silane selected from the group defined by Formula I when n is 1, at least one silane selected from the group defined by Formula I when n is 2, and at least one silane selected from the group defined by Formula I when n is 3.

12. The process of claim 11 wherein said at least four silanes react to form a siloxane star-graft polymer.

13. The process of claim 1 wherein the surface treatment solution comprises a siloxane-based polymer comprising the reaction product of tetrafunctional, trifunctional, difunctional, and monofunctional silane monomers, wherein w, x, y and z represent the mole percent of the tetrafunctional, trifunctional, difunctional and monofunctional monomeric-units, respectively, and wherein w is from about 20 to about 100, and x is from 0 to about 30, y is from 0 to about 50, and z is from 0 to about 10, respectively, and at least one of x, y and z is greater than zero.

14. The process of claim 13 wherein said siloxane-based polymer comprises the reaction product of at least one tetrafunctional silane monomer, at least one trifunctional silane monomer, at least one difunctional silane monomer, and at least one monofunctional silane monomer.

15. The process of claim 14, wherein said at least one tetrafunctional silane monomer is tetraethylorthosilicate;

said at least one trifunctional silane monomer is selected from the group consisting of γ-glycidoxypropyltrimethoxysilane, n-hexyltrimethoxysilane, isobutyltrimethoxy-silane, γ-methacryloxypropyltrimethoxysilane, n-octadecyltrimethoxysilane, and n-propyltrimethoxysilane;

said at least one difunctional silane monomer is selected from the group consisting of dicyclohexyldimethoxysilane, diethyldiethoxysilane, dimethyldichlorosilane, dimethyldiethoxysilane, dimethyldimethoxysilane, diphenyldiethoxysilane, diphenyldimethoxy-silane, di-n-hexyldichlorosilane, n-hexyl-methyldichlorosilane, methyldodecyldiethoxysilane, neophylmethyldimethoxysilane, and n-octylmethyldimethoxysilane; and said at least one monofunctional silane monomer is selected from the group consisting of n-octadecyldimethylmethoxysilane, triethylsilanol, trimethylethoxysilane, and trimethylmethoxysilane.

16. The substantially transparent, abrasion-resistant film formed by the process of claim 15.

17. The process of claim 1, wherein the cross-linkable resin is selected from the group consisting of acrylics, aminoplasts, urethanes, carbamates, carbonates, polyesters, epoxies, silicones, and polyamides.

18. The process of claim 1, wherein the cross-linkable resin is selected from the group consisting of aminoplasts, urethanes, carbamates, carbonates, polyesters, silicones, and polyamides.

19. The substantially transparent, abrasion-resistant film formed by the process of claim 1.

20. A substantially transparent, abrasion-resistant film comprising a cross-linked resin and a plurality of surface-treated nanocrystalline particles dispersed in a non-aggregating fashion in said cross-linked resin, said surface-treated nanocrystalline particles comprising nanocrystalline particles and at least one siloxane species disposed at the surface of at least some of said particles, wherein said nanocrystalline particles are selected from the group consisting of ceramics and metals.

21. The substantially transparent, abrasion-resistant film of claim 20 wherein said at least one siloxane species comprises a siloxane star-graft coating polymer.

22. The substantially transparent, abrasion-resistant film of claim 20 wherein said at least one siloxane species comprises a siloxane-based polymer, and said siloxane-based polymer comprises the reaction product of tetrafunctional, trifunctional, difunctional, and monofunctional silane monomers, wherein w, x, y and z represent the mole percent of the tetrafunctional, trifunctional, difunctional and monofunctional monomeric units, respectively, and wherein w is from about 20 to about 100, and x is from 0 to about 30, y is from 0 to about 50, and z is from 0 to about 10, respectively, and at least one of x, y and z is greater than zero.

23. The substantially transparent, abrasion-resistant film of claim 22 wherein said cross-linked resin is the product of at least one cross-linkable resin selected from the group consisting of acrylics, aminoplasts, urethanes, carbamates, carbonates, polyesters, epoxies, silicones, and polyamides.

24. The substantially transparent, abrasion-resistant film of claim 22 wherein said cross-linked resin is the product of at least one cross-linkable resin selected from the group consisting of aminoplasts, urethanes, carbamates, carbonates, polyesters, silicones, and polyamides.

25. The substantially transparent, abrasion-resistant film formed of claim 22, wherein said film has a hardness of 2B or harder, as measured by the ASTM D3363 Pencil Test.

26. The substantially transparent, abrasion-resistant film formed of claim 22, wherein said film has a percent haze less than about 14%.

27. The substantially transparent, abrasion-resistant film formed of claim 22, wherein said film has a percent haze less than about 1%.

28. A process for making a film-forming composition containing surface-treated nanocrystalline particles dispersed in a cross-linkable resin, said film-forming composition being suitable for forming a transparent, abrasion-resistant film, said process comprising the steps of:

(a) adding nanocrystalline particles to a medium, said nanocrystalline particles being selected from the group consisting of ceramics and metals;

(b) mixing the nanocrystalline particles and medium form a dispersion;

(c) adding a surface treatment solution to the nanocrystalline particle dispersion, said surface treatment solution comprising at least one siloxane species;

(d) mixing the nanocrystalline particle dispersion with the surface treatment solution such that said at least on siloxane species is disposed at the surface of at least some of said plurality of particles, whereby surface-treated nanocrystalline particles are obtained;

(e) adding said surface-treated nanocrystalline particles to a cross-linkable resin, wherein the surface-treated nanocrystalline particles are non-aggregating, to form a film-forming composition; wherein a cross-linkable film-forming composition is formed.

29. The process of claim 28 wherein the nanocrystalline particles comprise materials selected from the group consisting of the oxides of aluminum, titanium, zinc, cerium, tin, antimony, indium, iron, strontium, barium, and yttrium, including mixed oxides, and combinations or mixtures of any of the foregoing oxides.

30. The process of claim 28 wherein the nanocrystalline particles comprise materials selected from the group consisting of oxides of aluminum, titanium, zinc, and cerium, and mixtures thereof.

31. The process of claim 28 wherein the nanocrystalline particles and the medium are mixed by a method selected from stirring, high-shear mixing, ultrasonic vibration, and blending in a media mill.

32. The process of claim 28 wherein the nanocrystalline particle dispersion has a concentration of the nanocrystalline particles in the range of from about 0.1 percent by weight to about 75 percent by weight.

33. The process of claim 28 wherein the nanocrystalline particle dispersion has a concentration of the nanocrystalline particles in the range of from about 1 percent by weight to about 50 percent by weight.

34. The process of claim 28 wherein the nanocrystalline particle dispersion has a concentration of the nanocrystalline particles in the range of from about 5 percent by weight to about 40 percent by weight.

35. The process of claim 28 wherein said surface treatment solution is prepared from one or more silane monomers defined by Formula I, wherein Formula I is $R_nSi(OR')_{4-n}$, wherein R is a hydrocarbyl entity, optionally containing one or more functional groups, R' is a hydrocarbyl entity, optionally containing one or more functional groups, and n is 0, 1, 2, or 3.

36. The process of claim 35 wherein

R further comprises one or more functional groups selected from the group consisting of saturated or unsaturated alkyl, aromatic, alcohol, aldehyde, ester, epoxide, carboxylic acid, ether, ketone, amine, sulfonate, thiol, phosphine, phosphate, cyanate, isocyanate, fluoro, and pyridine; and R' is an alkyl group.

37. The process of claim 28 wherein the surface treatment solution is prepared from at least four silanes, with at least one silane selected from the group defined by Formula I when n is 0, at least one silane selected from the group defined by Formula I when n is 1, at least one silane selected from the group defined by Formula I when n is 2, and at least one silane selected from the group defined by Formula I when n is 3.

38. The process of claim 37 wherein said at least four silanes react to form a siloxane star-graft polymer.

39. The process of claim 28 wherein said at least one siloxane species comprises a siloxane-based polymer comprising the reaction product of tetrafunctional, trifunctional, difunctional, and monofunctional silane monomers, wherein w, x, y and z represent the mole percent of the tetrafunctional, trifunctional, difunctional and monofunctional monomeric units, respectively, and wherein w is from about 20 to about 100, and x is from 0 to about 30, y is from 0 to about 50, and z is from 0 to about 10, respectively, and at least one of x, y and z is greater than zero.

40. The process of claim 39 wherein said siloxane-based polymer comprises the reaction product of at least one tetrafunctional silane monomer, at least one trifunctional silane monomer, at least one difunctional silane monomer, and at least one monofunctional silane monomer.

41. The process of claim 40, wherein said at least one tetrafunctional silane monomer is tetraethylorthosilicate;

said at least one trifunctional silane monomer is selected from the group consisting of γ-glycidoxypropyl-trimethoxysilane, n-hexyltrimethoxysilane, isobutyltrimethoxy-silane, γ-methacryloxypropyl-trimethoxysilane, n-octadecyltrimethoxysilane, and n-propyltrimethoxysilane;

said at least one difunctional silane monomer is selected from the group consisting of dicyclohexyldimethoxysilane, diethyldiethoxysilane, dimethyldichlorosilane, dimethyldiethoxysilane, dimethyldimethoxysilane, diphenyldiethoxysilane, diphenyldimethoxy-silane, di-n-hexyldichlorosilane, n-hexyl-methyldichlorosilane, methyldodecyl-diethoxysilane, neophylmethyldimethoxysilane, and n-octylmethyldimethoxysilane; and said at least one monofunctional silane monomer is selected from the group consisting of n-octadecyldimethylmethoxysilane, triethylsilanol, trimethylethoxysilane, and trimethylmethoxysilane.

42. The film-forming composition made by the process of claim 41.

43. The process of claim 28, wherein said film-forming composition comprises a discontinuous phase, and said cross-linkable resin is disposed in said discontinuous phase.

44. The process of claim 28, wherein said film-forming composition comprises an emulsion.

45. The film-forming composition made by the process of claim 28.

46. A film-forming composition comprising a cross-linkable resin and a plurality of surface-treated nanocrystalline particles dispersed in said cross-linkable resin in a non-aggregating fashion, said surface-treated nanocrystalline particles comprising nanocrystalline particles and at least one siloxane species disposed at the surface of at least some of said plurality of particles, wherein said nanocrystalline particles are selected from the group consisting of ceramics and metals.

47. The film-forming composition of claim 46 wherein said siloxane species comprises a siloxane-based polymer.

48. The film-forming composition of claim 47 wherein said siloxane-based polymer comprises a siloxane star-graft coating polymer.

49. The film-forming composition of claim 46 wherein
   said siloxane-based polymer comprises the reaction product of tetrafunctional, trifunctional, difunctional, and monofunctional silane monomers,
   wherein w, x, y and z represent the mole percent of the tetrafunctional, trifunctional, difunctional and monofunctional monomeric units, respectively, and
   wherein w is from about 20 to about 100, and x is from 0 to about 30, y is from 0 to about 50, and z is from 0 to about 10, respectively, and at least one of x, y and z is greater than zero.

50. The film-forming composition of claim 46 herein said cross-linkable resin is selected from the group consisting of acrylics, aminoplasts, urethanes, carbamates, carbonates, polyesters, epoxies, silicones, and polyamides.

51. The film-forming composition of claim 46 wherein said cross-linkable resin is selected from the group consisting of aminoplasts, urethanes, carbamates, carbonates, polyesters, silicones, and polyamides.

* * * * *